(12) United States Patent
Hawkinson et al.

(10) Patent No.: US 7,451,215 B2
(45) Date of Patent: Nov. 11, 2008

(54) OPC SERVER REDIRECTION MANAGER

(75) Inventors: Ellen B. Hawkinson, Phoenix, AZ (US); Timothy J. Fortin, Phoenix, AZ (US); Anuradha Vidyashankar, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/786,508

(22) Filed: Apr. 12, 2007

(65) Prior Publication Data

US 2007/0198709 A1 Aug. 23, 2007

Related U.S. Application Data

(62) Division of application No. 10/403,704, filed on Mar. 31, 2003.

(60) Provisional application No. 60/392,493, filed on Jun. 28, 2002.

(51) Int. Cl.
*G06F 15/173* (2006.01)
*G06F 15/16* (2006.01)
*G06F 3/00* (2006.01)

(52) U.S. Cl. .................. 709/224; 709/203; 719/318
(58) Field of Classification Search .......... 709/203, 709/224; 719/318
See application file for complete search history.

(56) References Cited

U.S. PATENT DOCUMENTS

| 2002/0156872 | A1* | 10/2002 | Brown ................. 709/219 |
| 2003/0060900 | A1* | 3/2003 | Lo et al. ............... 700/19 |
| 2004/0024891 | A1* | 2/2004 | Agrusa et al. ......... 709/230 |

OTHER PUBLICATIONS

OPC-Real-Time Drivers at Matrikon.com; "*Matrikon: We Make Connection*", www.matrikon.com/drivers/,p. 1-10.
OPC Demo Tutorial; "*Matrikon: Solution for Industrial Agility*", p. 1-30.

* cited by examiner

*Primary Examiner*—Jason Cardone
*Assistant Examiner*—Tanim Hossain
(74) *Attorney, Agent, or Firm*—Ohlandt, Greeley, Ruggiero & Perle, LLP (57) ABSTRACT

An OPC redirection manager maintains the information necessary for taking appropriate action when the target OPC server fails and for ensuring that no bad status is returned to the client. Any existing OPC client needing seamless failover between target OPC data access and/or alarm and event servers will connect to a uniquely configured instance of the redirection manager instead of connecting to the primary server. The client application continues to perform OPC related tasks as usual. Because each client connection is unique, the redirection manager itself is not a single point of failure. Each configured redirection manager instance monitors the health of the target server mode and the target server itself by subscribing to failure events.

3 Claims, 10 Drawing Sheets

OPC SERVER REDIRECTION MANAGER

CROSS REFERENCE

This application is a divisional application of U.S. patent application Ser. No. 10/403,704, filed on Mar. 31, 2003, which claims priority of U.S. Provisional Patent Application Ser. No. 60/392,493, filed on Jun. 28, 2002, entitled "OPC Server Redirection Manager."

BACKGROUND

1. Field of the Invention

The present invention generally relates to an OPC server redirection manager, which is an intermediate OPC server that forwards all OPC calls made by clients to actual OPC servers that communicate with data sources. In particular, the OPC server redirection manager maintains the information necessary to take appropriate action when a target OPC server fails and ensures that no bad status is returned to a client.

2. Description of the Related Art

OLE FOR PROCESS CONTROL® (OPC®) is an emerging industry standard that facilitates integration by allowing automation systems to share information and interoperate with other industrial automation, process control, and other business systems for plants or factories. (The letters O-P-C originally stood for Object Linking and Embedding (OLE) for Process Control, but OLE has been restructured from object-oriented to object-based and renamed ActiveX.) The OPC standard is a non-proprietary technical specification that is maintained by the OPC Foundation®.

In the past, each software or application developer needed to write a custom interface (or server/driver) to exchange data with hardware field devices. The OPC standard replaced this practice by providing a common interface that permits this work to be done once, and then easily reused by Human Machine Interface (HMI), Supervisory Control and Data Acquisition (SCADA) control and custom applications.

The OPC specification is based upon the Microsoft® OLE (now ActiveX), Component Object Model (COM), and Distributed Component Object Model (DCOM) technologies. OPC defines a standard set of interfaces, properties, and methods for use in process control, manufacturing, and automation applications. These applications include distributed control systems, programmable logic controllers, input/output (IO) systems, smart field devices, and other servers of real-time information. The ActiveX/COM technologies define how individual software components interact and share data. By using the Microsoft® Visual Basic object-oriented component, OLE Automation, OPC can provide office applications with plant floor data via local area networks (LANs), remote sites, or the Internet.

OPC provides many benefits to end users and hardware and software manufacturers, including open connectivity, high performance, and improved vendor productivity. OPC provides open connectivity giving users a choice among a wider variety of plant floor devices and client software, allowing better utilization of best-in-breed applications. Because OPC is an open standard, software and hardware manufacturers devote less time to connectivity issues and more time to application issues, eliminating significant duplicate effort. OPC fosters greater interoperability between automation and control applications, field devices, and business and office applications.

Some redirection systems provide inferior functionality to the redirection manager according to the present invention and they appear to have different architectures. One redirection system is implemented as a Microsoft Windows® service, whereas the redirection manager according to the present invention uses a private connection approach to limit the impact of failure. Redirection systems implement OPC data access, whereas the redirection manager according to the present invention has redirection servers that implement those as well as OPC alarms and events. Redirection systems appear to implement server/node health via a ping mechanism, whereas the redirection manager according to the present invention uses a monitoring approach with less network traffic overhead. Certain OPC servers synchronize the internal OPC server database for performance and consistency reasons. The redirection manager according to the present invention optionally provides this capability.

Other redirection systems provide a service to which all clients connect. If that service fails, then all connected clients are impacted. By contrast, clients using the redirection manager according to the present invention have a private connection. If the private connection fails, then only the connected client is impacted. Conventional redirection systems use a ping mechanism for detection. This is less efficient than the redirection manager according to the present invention, which uses notification providers to alert the redirection manager when target nodes or servers fail.

The present invention overcomes these problems by maintaining the information necessary for taking appropriate action when the target OPC server fails and for ensuring that no bad status is returned to the client. Any existing OPC client needing seamless failover between target OPC data access and/or alarm and event servers will connect to a uniquely configured instance of the redirection manager instead of connecting to the primary server. The client application continues to perform OPC related tasks as usual. Because each client connection is unique, the redirection manager itself is not a single point of failure. Each configured redirection manager instance monitors the health of the target server node and the target server itself by subscribing to failure events. Use of subscription rather than polling (via ping) reduces network traffic. The present invention also provides many additional advantages as described below.

SUMMARY OF THE INVENTION

One embodiment of the present invention is a redirection management method. In response to a first client connection request for a first OPC client, a first private connection is granted from the first OPC client to a first instance of an OPC redirection manager. In response to a second client connection request for a second OPC client, a second private connection is granted from the second OPC client to a second instance of the OPC redirection manager. According to one embodiment, even though the second private connection for the second OPC client is lost when the second instance of the OPC redirection manager fails, the first private connection for the first OPC client is maintained. A connection is made to a first target OPC server. Another connection is made to an OPC server status change provider for the first target OPC server. According to another embodiment, additional connections are made to at least one additional target OPC server, including a second target OPC server configured to backup the first target OPC server.

Upon receiving an active-server-failed event from the OPC server status change provider for the first target OPC server, a switchover to the second target OPC server is performed. Notice is received from the OPC server status change provider that the first target OPC server is now available and a connection is made to the first target OPC server.

Assuming no failure had occurred, an OPC add-group request is received from the first OPC client and it is forwarded to the first target OPC server to service. Upon receiving a request-complete event from the first target OPC server, a plurality of add-group interfaces associated with the OPC add-group request are implemented by creating at least one group. The OPC add-group request is forwarded to each of the additional target OPC servers to store the group(s) as inactive. Information is stored that is related to the OPC add-group request, including the group(s).

An OPC on-data-change request is received by the redirection manager from the first OPC client and a connection is established between the first target OPC server and a first sink object. The sink objects belong to the redirection manager. Another connection is established between the second target OPC server and a second sink object. Information related to the OPC on-data-change request, including the at least one group is stored. A first on-data-change request is provided to the first OPC client from the redirection manager following the redirection manager's receipt of the on-data-change request from the first target OPC server. Upon receiving an active-server-failed event from the OPC server status change provider for the first target OPC server, a switchover is performed to the second target OPC server. At least one group is activated on the second target OPC server and a second on-data-change request is provided to the first OPC client from the redirection manager following the redirection manager's receipt of the on-data-change request from the second target OPC server. Notice that the first target OPC server is now available is received from the OPC server status change provider, a connection is made to the first target OPC server and previously stored information is used to add the group(s) to the first target OPC server.

Another embodiment of the present invention is a method of redirection management. In response to an OPC create-event-subscription request from an OPC client, interfaces associated with the OPC create-event-subscription request are implemented. The OPC create-event-subscription request is forwarded to a primary target OPC server for service. It is also forwarded as inactive to at least one additional target OPC server, including a secondary target OPC server configured to backup the primary target OPC server. Information related to the OPC create-event-subscription request is stored, including state information.

A connection is made by the redirection manager to the primary target OPC server. Additional connections are made by the redirection manager to an OPC server status change provider for the primary target OPC server and to additional target OPC server(s). If it is determined that the primary target OPC server supports OPC alarms and events, an alarms-and-events module is loaded. At least one on-event request is provided to the OPC client from the primary target OPC server. Upon receiving an active-server-failed event from the OPC server status change provider for the primary target OPC server, a switchover to the secondary target OPC server is performed and the alarms-and-events module is notified of the switchover. A currently active event is synchronized with the secondary target OPC server to prevent loss of data and an OPC on-event request is provided to the OPC client from the secondary target OPC server. When notice from the OPC server status change provider is received that the primary target OPC server is now available, a connection is made to the primary target OPC server and it is established with the state information.

Another embodiment of the present invention is an OPC redirection management system comprising a first OPC server, a second OPC server, and a first redirection manager. The first OPC server is capable of servicing an OPC request. The second OPC server is configured to backup the first OPC server. The first redirection manager is capable of forwarding an OPC request on behalf of a first OPC client to either the first OPC server or the second OPC server. The first OPC client is capable of establishing its own private connection with the first redirection manager. The first redirection manager is capable of connecting to the second OPC server upon failure of the first OPC server to provide seamless service to the first OPC client. The first redirection manager is capable of storing information associated with the OPC request for use upon failure of the first OPC server.

The OPC redirection management system may also comprise a third OPC server, a fourth OPC server, and a second redirection manager. The fourth OPC server is configured to backup the third OPC server. A second OPC client is capable of establishing its own private connection with the second redirection manager. The second redirection manager is capable of connecting to the fourth OPC server upon failure of the third OPC server to provide seamless service to the second OPC client. The first OPC server is capable of being configured to backup a third OPC server. The OPC request may be of type data access or alarm and events.

The OPC redirection management system may also comprise a primary server node, a secondary server node, and a client node. The primary server node comprises the first OPC server, a primary node status change provider, and a primary OPC status change provider. The secondary server node comprises the second OPC server, a secondary node status change provider, and a secondary OPC status change provider. The client node comprises the first OPC client, the first redirection manager, a client node status change provider, and a client OPC status change provider. The first redirection manager comprises data access and subscription state data and a switchover manager. The first OPC server comprises an item cache and a condition database. The first OPC client is a process control application. The first OPC server communicates with a device to service the OPC request so that the first OPC client receives information about the device as a result of the OPC request.

Another embodiment of the present invention is a machine-readable medium storing executable instructions for performing a method. In response to a first client connection request for a first OPC client, a first private connection is granted from the first OPC client to a first instance of an OPC redirection manager. In response to a second client connection request, a second private connection is granted from the second OPC client to a second instance of the OPC redirection manager. A connection is made to a node status change provider for the second OPC client. When the redirection manager fails and the private connection for the second OPC client is lost, the first private connection for the first OPC client is maintained. A connection is made to a first target OPC server. Another connection is made to an OPC server status change provider for the first target OPC server. Another connection is made to a second target OPC server configured to backup the first target OPC server. Upon receiving an active-server-failed event from the OPC server status change provider for the first target OPC server, a switchover to the second target OPC server is performed.

These and other features, aspects, and advantages of the present invention will become better understood with reference to the following drawings, description, and appended claims.

DETAILED DESCRIPTION OF THE PREFERRED EMBODIMENTS

In the following detailed description, reference is made to the accompanying drawings. These drawings form a part of this specification and show by way of example specific preferred embodiments in which the present invention may be practiced. These embodiments are described in sufficient detail to enable those skilled in the art to practice the present invention. Other embodiments may be used. Structural, logical, and electrical changes may be made without departing from the spirit and scope of the present invention. Therefore, the following detailed description is not to be taken in a limiting sense and the scope of the present invention is defined only by the appended claims.

Figure 1:
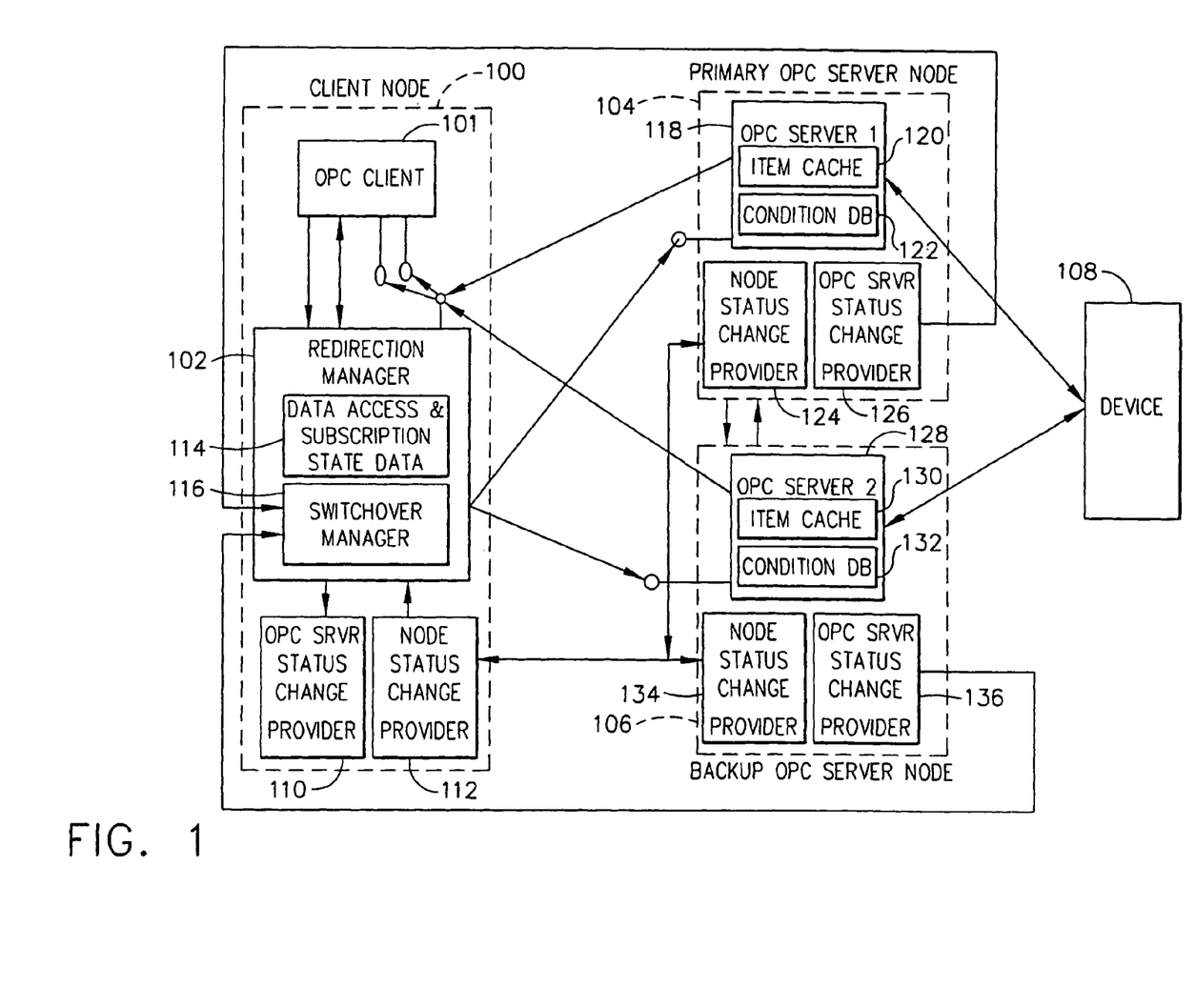
FIG. 1 is a block diagram of a single client connection for a redirection manager system architecture according to the present invention.

FIG. 1 shows a single client connection for a redirection manager system architecture according to the present invention. Within a client node 100 is an OPC client 101 which is connected to a single instance of a redirection manager 102 that, in turn, communicates with components inside a primary OPC server node 104 and components inside a backup OPC server node 106. Components inside primary OPC server node 104 and backup OPC server node 106 communicate with a device 108.

OPC client 101 connects to redirection manager 102 instead of directly connecting to primary OPC server node 104. Redirection manager 102 is configured for OPC client 101 using a configuration utility. Once configuration is complete, OPC client 101 continues to perform OPC related tasks as usual. Each configured redirection manager 102 is registered so that it points to an installed executable. At the time of client connection, a new instance of redirection manager 102 is created. This new instance executes in a unique process address space. It is identifiable to OPC client 101 by a unique identification for status purposes. In addition to an instance of redirection manager 102, Client node 100 has an OPC server status change provider 110 and a node status change provider 112.

Redirection manager 102 is an intermediate OPC server that forwards OPC requests made by OPC client 101 to primary OPC server node 104 that communicates with device 108. Redirection manager 102 maintains the information necessary to take appropriate actions when primary OPC server node 104 fails and ensures that no bad status is returned to OPC client 101. Redirection manager 102 has data access and subscription state data 114 and a switchover manager 116 to change the active server.

Primary OPC server node 104 communicates with device 108 and other data sources that OPC client 101 wants access to reading and writing data and is configured to be a primary server for redirection manager 102. In addition, primary OPC server node 104 is configurable as a secondary server for a different redirection manager than redirection manager 102 (see FIG. 2). The active OPC server is either primary OPC server node 104 or the backup OPC server node 106 and is the server that is currently servicing the OPC requests for OPC client 101 through redirection manager 102. Primary OPC server node 104 has an OPC server 118 with an item cache 120 and a condition database 122, a node status change provider 124, and an OPC server status change provider 126. Current data values are stored in item cache 120 and alarm states are stored in condition database 122.

Secondary or backup OPC server node 106 is the active OPC server when primary OPC server node 104 fails. In addition, backup OPC server node 106 is configurable as a primary server for a different redirection manager (see FIG. 2). Like primary OPC server node 104, backup OPC server node 106 has an OPC server 128 with an item cache 130 and a condition database 132, a node status change provider 134, and an OPC server status change provider 136.

Device 108 is a data source that is capable of servicing data access or IO requests as well as pushing alarms and events to OPC servers.

Redirection manager 102 according to the present invention is an OPC server that may support OPC Data Access 2.05 and 1.0A, OPC Alarms and Events 1.0 and OPC Security 1.0 interfaces as well as other OPC data access, OPC alarms and events and other OPC interfaces known presently or in the future. It is not a true OPC server in the sense that it does not communicate with real data sources, and instead is used to forward client calls to and from the actual OPC servers and to maintain state information allowing it to switch to a backup server when the primary server fails. Redirection manager 102 is implemented as an out-of-process .exe server (see FIG. 2). There is one .exe server per client connection to redirection manager 102. Those OPC requests that alter the state of the client connection but do not request IO are made to both the primary and backup servers, e.g., primary OPC server node 104 and backup OPC server node 106. IO requests are only made to primary OPC server 118. This puts the secondary in a hot-standby mode. In the event that primary OPC server 118 fails, redirection manager 102 activates the backup OPC server 128 and issues IO requests. Since OPC client 101 is unaware of the switch, it can significantly reduce error handling scenarios in OPC client 101 itself. Redirection manager 102 supports a cold-standby redundancy scheme as well. In this case, state is not replicated to backup OPC server 128. All state is set up at switchover time.

Redirection manager 102 also supports optional browsing interfaces. Redirection manager 102 forwards all the calls to either primary OPC server 118 or backup OPC server 128 or to all servers, while maintaining state information related to the calls for redirection purposes. The server that is currently servicing IO requests is referred to as the active server. In the event, the currently active server fails, redirection manager 102, as part of the switchover process, sets one of the backup servers to be the new active server.

Redirection manager 102 saves the state of the requests of OPC client 101 to redirect them or reissue them to a backup server when the primary server fails and also for various other scenarios. One approach is to categorize the client calls as IO and non-IO requests. The classification is made as follows. Those OPC requests that alter the state of the client connection but do not request IO are classified as non-IO requests, such as add-group, add-item, create-event-subscription, and set-filter-calls. Client IO calls are classified as IO requests, such as read, write, and ack-condition.

Persisting state of these calls is handled differently. Non-IO calls are maintained as long as OPC client 101 is running. One scenario where this information is needed is to sync-up a backup server that comes up after OPC client 101 has made add-group and add-items calls. The IO call information is persisted only until either the primary or backup server services the call. Once the call successfully completes, the IO information about the call is deleted.

Redirection manager 102 examines all the errors returned by the active server. Those errors which indicate a failure along the communication path between redirection manager 102 and the active server will cause redirection manager 102 to initiate a switchover. Those errors which do not indicate a failure along this communication path are forwarded to OPC client 102. OPC client 101 handles these errors the same way as it would if connected to the servers directly. Redirection manager 102 saves the state of all non-IO calls and hence can attempt the re-sync. All OPC calls categorized as non-IO are sent to both the primary and backup servers. The call has to succeed on the active server before the request is issued to the backup server. If the request fails on the backup, the error is logged but not returned to the client. At this point, the backup server is considered out of sync with the active server. The Redirection Manager attempts to re-sync the backup on a switchover. If the re-sync fails, the Redirection Manager does not switchover to the secondary.

During initialization, redirection manager 102 establishes a connection with the target servers, e.g., primary OPC server node 104 and backup OPC server node 106. Also, redirection manager 102 establishes connections with status change providers, such as OPC server status change provider 110 to subscribe to events that may trigger switchover manager 116. For node failures, redirection manager 102 connects to node status change provider 112. Node status change provider 112 communicates with peer node status change providers, such as node status change provider 106 to monitor the health of other nodes. Similarly, redirection manager 102 establishes a remote subscription connection to the OPC server status change providers, such as OPC server status change providers 126 and 136 on each target OPC server node, such as primary OPC server node 104 and backup OPC server node 106. Changes in server state are forwarded to redirection manager 102. If primary OPC server node 104's OPC server 118 transitions from a running state, then redirection manager 102 initiates a switchover to backup OPC server node 106 through switchover manager 116. If backup OPC server 128 transitions from the running state and becomes unavailable, subsequent transition to running results in synchronization.

Redirection manager 102 reports its status to OPC server status change provider 110. This enables integration with a hosting system status display component. The health of the connection from OPC client 101 to redirection manager 102 as well as the health of target OPC servers 118, 128 are exposed to the user.

OPC client 101 makes OPC requests to redirection server 102 as if it were directly connected to target OPC servers 118, 128. For each client group creation, redirection manager 102 forwards the request to the active and backup OPC servers 118, 128. Requests to activate the group collection are only performed on the active OPC server. Group data collection is inactive on the backup servers. Similarly, requests to activate event subscriptions are only performed on the active OPC server. Event subscriptions remain inactive on the backup OPC servers.

Requests to collect particular data sources may require conversion to a name within the namespace of device 108. If device 108 is remotely located, this name conversion operation may be costly in terms of performance. Therefore, redirection manager 102 is optimized to synchronize the device namespace handles without requesting multiple conversion operations for device 108.

Redirection manager 102 makes all the OPC calls or requests to primary OPC server 118 and backup OPC server 128 on separate threads. This allows OPC calls that fail due to server failure to be reissued to backup OPC server 128. After creating the thread, primary OPC server 118 waits on a request-complete event signaled by the thread issuing the call to backup OPC server 128. Once the event is signaled, primary OPC server 118 returns the results back to OPC client 101. Redirection manager 102 also waits on an active-server-failed event to be signaled when the active server fails. If this event is signaled, redirection manager 102 looks for an alternate server and reissues the failed request to that server. An internal timeout period is added to the waits to take care of those scenarios that notification providers or redirection manager 102 itself may not handle. In this way, if either of the above two events are not signaled, redirection manager 102 is not left hanging forever. The timeout period is provided as a configuration option.

There is an approach followed for callbacks both for data access as well as alarm and events. Redirection manager 102 implements all the callbacks of OPC client 101. It intercepts the callbacks of the active OPC server, holds all the sink interfaces of OPC client 101, and issues the callbacks to OPC client 101. This ensures that no bad values are returned to OPC client 101 during switchover. For data access, no asynchronous read or write calls are missed when the active server fails before callback can happen. Redirection manager 102 keeps track of whether the callbacks were completed, and reissues the call again to the backups when the switchover happens. Redirection manager 102 callback forwards the event to the client on-event callback or forwards the data request to the on-data-change callback. When the active server fails, redirection manager 102 activates the client subscriptions or data access groups on the secondary server. Redirection manager 102 refreshes event subscriptions and starts processing callbacks from the secondary server.

Figure 2:
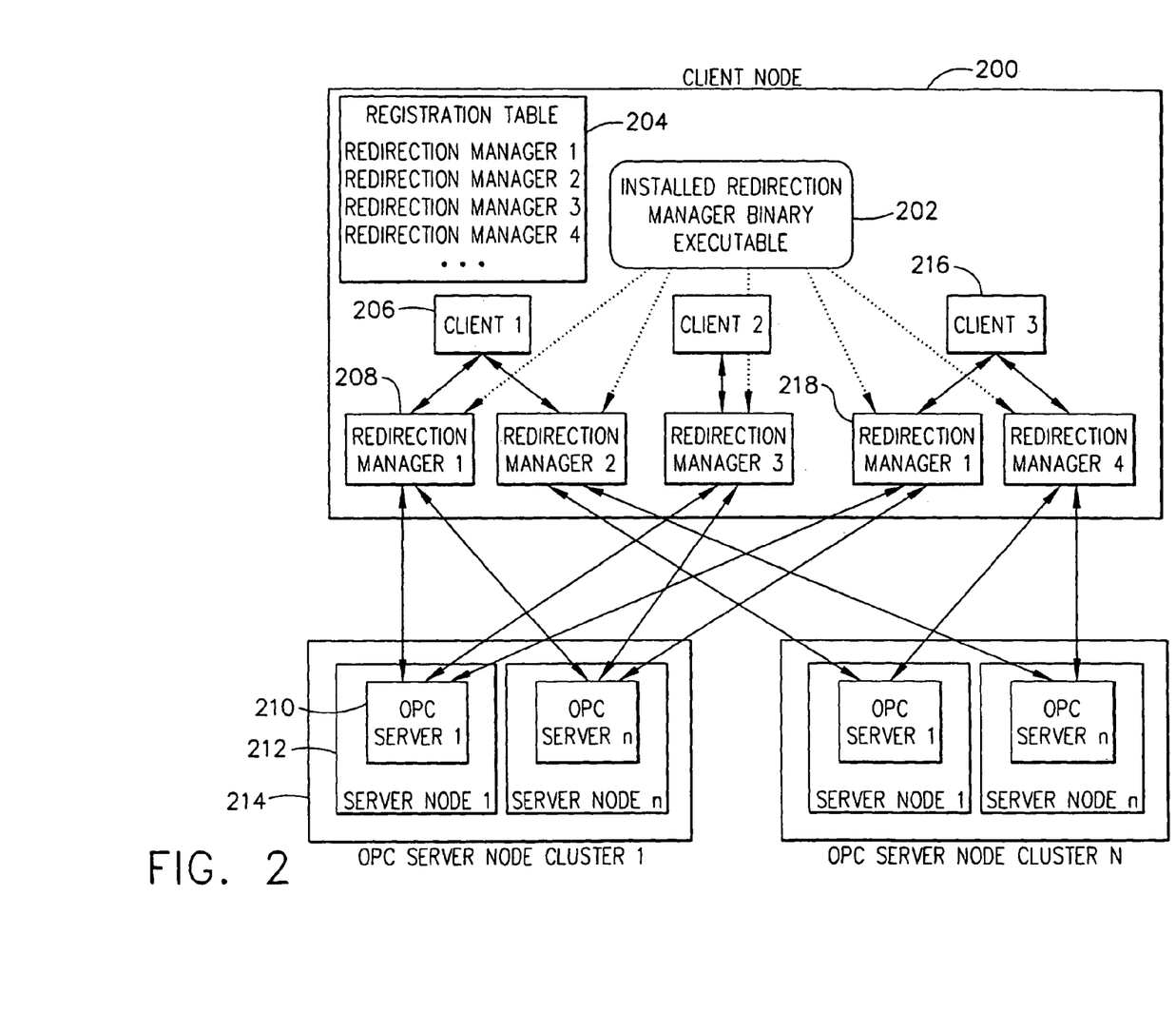
FIG. 2 is a block diagram of multiple client connections to multiple instances of a redirection manager according to the present invention.

FIG. 2 is a block diagram of multiple client connections to multiple instances of a redirection manager according to the present invention. Client node 200 has an installed redirection manager binary executable 202. A configuration tool creates entries for registered redirection managers in a registration table 204 that resides in the Microsoft Windows® registry. Configuring includes identifying the target OPC servers. When a client, such as client one 206, connects to a registered redirection manager, such as redirection manager one 208, a new instance of the installed redirection manager binary executable 202 is created. Each instance executes in its own process space, is independent of any other running instance, and is visible to the native operating system. Clients connect to various multiple registered redirection managers, such as redirection manager one, two, three, and four. If the first instance of redirection manager one 208 fails, then only client one 206 is effected, because client three 216 has its own private connection to the second instance of redirection manager one 218. The registered redirection managers, in turn, communicate with multiple OPC servers, such as OPC server 210. Multiple OPC servers reside in server nodes, such as server node 212. Multiple server nodes reside in clusters, such as OPC server node cluster 214. There can be any number of clients, redirection managers, OPC servers, server nodes, and OPC server node clusters.

FIGS. 3-10 are sequence diagrams for a number of scenarios of how a redirection manager operates according to the present invention. Although the redirection manager is designed to accommodate two or more target OPC servers, the sequence diagrams use only two target OPC servers (i.e., primary and secondary). This is for illustrative purposes only, to make the sequence diagrams simpler and more easily understood. The first target to which the redirection manager successfully connects is referred to as the active server. The remaining target OPC servers are referred to as alternates. The redirection manager according to the present invention supports specifications from both the OPC data access and OPC alarms and events initiatives. In the following scenarios, a particular initiative may be mentioned, but the redirection manager according to the present invention is able to service both data access clients and alarms and events clients simultaneously.

Each table below for FIGS. 3-10 summarizes the specific events in the corresponding figure. However, there is not a one-to-one correspondence between the event numbers in the tables and the step numbers in FIGS. 3-10.

Figure 3:
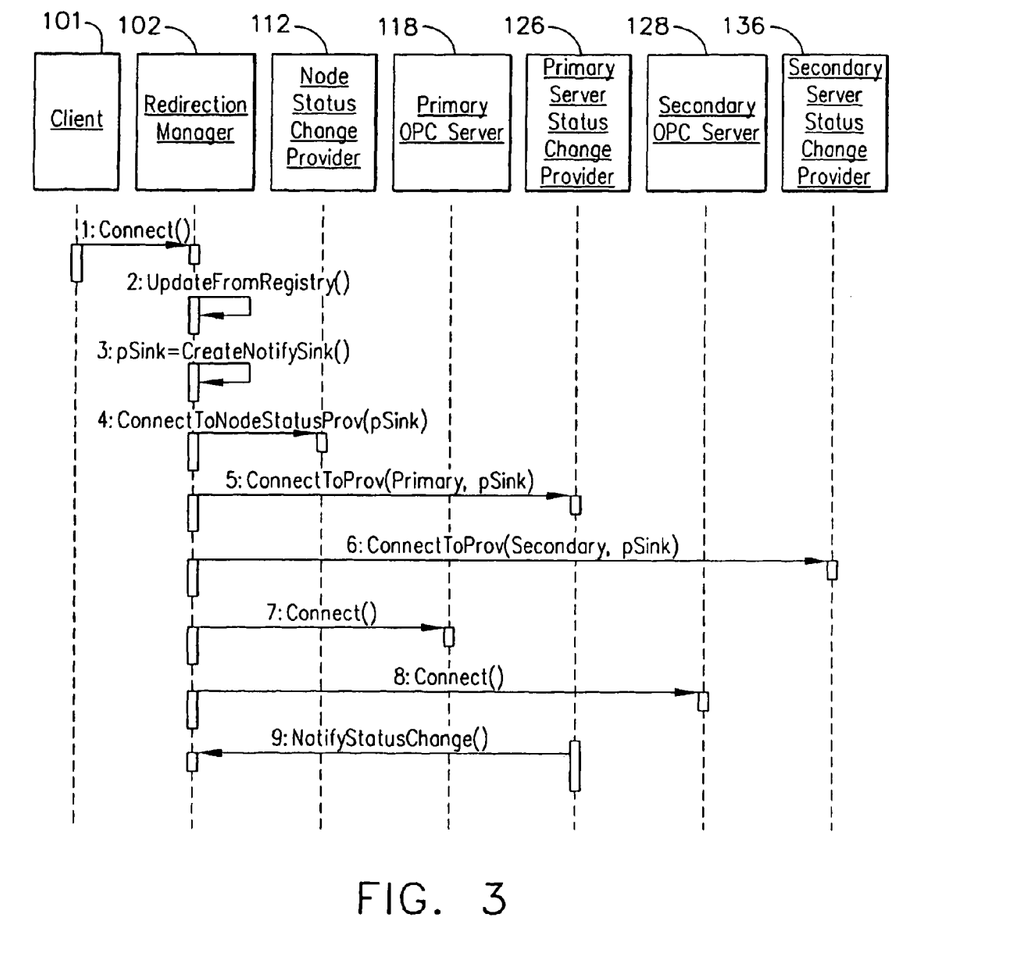
FIG. 3 is a sequence diagram of how a client connection is made by a redirection manager, according to the present invention.

FIG. 3 shows how a client connection is made by a redirection manager, according to the present invention. Each of the components identified in the boxes along the top of FIG. 3 run in separate processes. These components are client 101, redirection manager 102, node status change provider 112, primary OPC server 118, primary server status change provider 126, secondary OPC server 128, and secondary server status change provider 136.

FIG. 3 assumes some starting conditions. The user or administrator has used a configuration tool to create a named instance of a redirection manager server. This instance includes the identification of target OPC servers. This information is stored by the configuration tool into a registry location known to the redirection manager runtime (see FIG. 2). All target OPC servers are available.

Table 1 generally describes the specific events shown in FIG. 3. Each event in Table 1 is implemented in example methods shown in FIG. 3.

TABLE 1

| Client Connection | |
|---|---|
| Event | Description of Event |
| 1 | OPC client 101 connects to redirection manager 102 using standard COM connection mechanisms. |
| 2 | Redirection manager 102, as a COM server, responds to the connection request by granting OPC client 101 its own private connection that results in a unique process. This is possible because redirection manager 102 establishes with COM that each instance of redirection manager is to execute in its own process. A second client to the same redirection manager 102 gets its own process. |
| 3 | Redirection manager 102 uses the Microsoft Windows ® registry to determine if the user/administrator has made the necessary configurations. (The user is expected to have used a separate configuration tool to define the target OPC servers.) Redirection manager 102 connects to the target OPC servers, primary OPC server 118 and secondary OPC server 128, using standard COM mechanisms. |
| 4 | Redirection manager 102 supports the OPC data access initiative by default. If redirection manager 102 determines that the target OPC servers, primary OPC server 118 and secondary OPC server 128, support the OPC alarms and events initiative, redirection manager 102 loads an alarms and events support module to expand its default capabilities. If it is determined that the target OPC servers do not support the OPC alarms and events initiative, redirection manager 102 favors conservation of system resources and thus does not load this module. |
| 5 | Next, redirection manager 102 establishes connection with the status change providers. It connects to node status change provider 112 on the local node. Then, it connects to primary server status change provider 126 and secondary server status change provider 136 on the target OPC server nodes. These providers notify redirection manager 102 of status changes, such as failure for either the node or OPC servers. |

Figure 4:
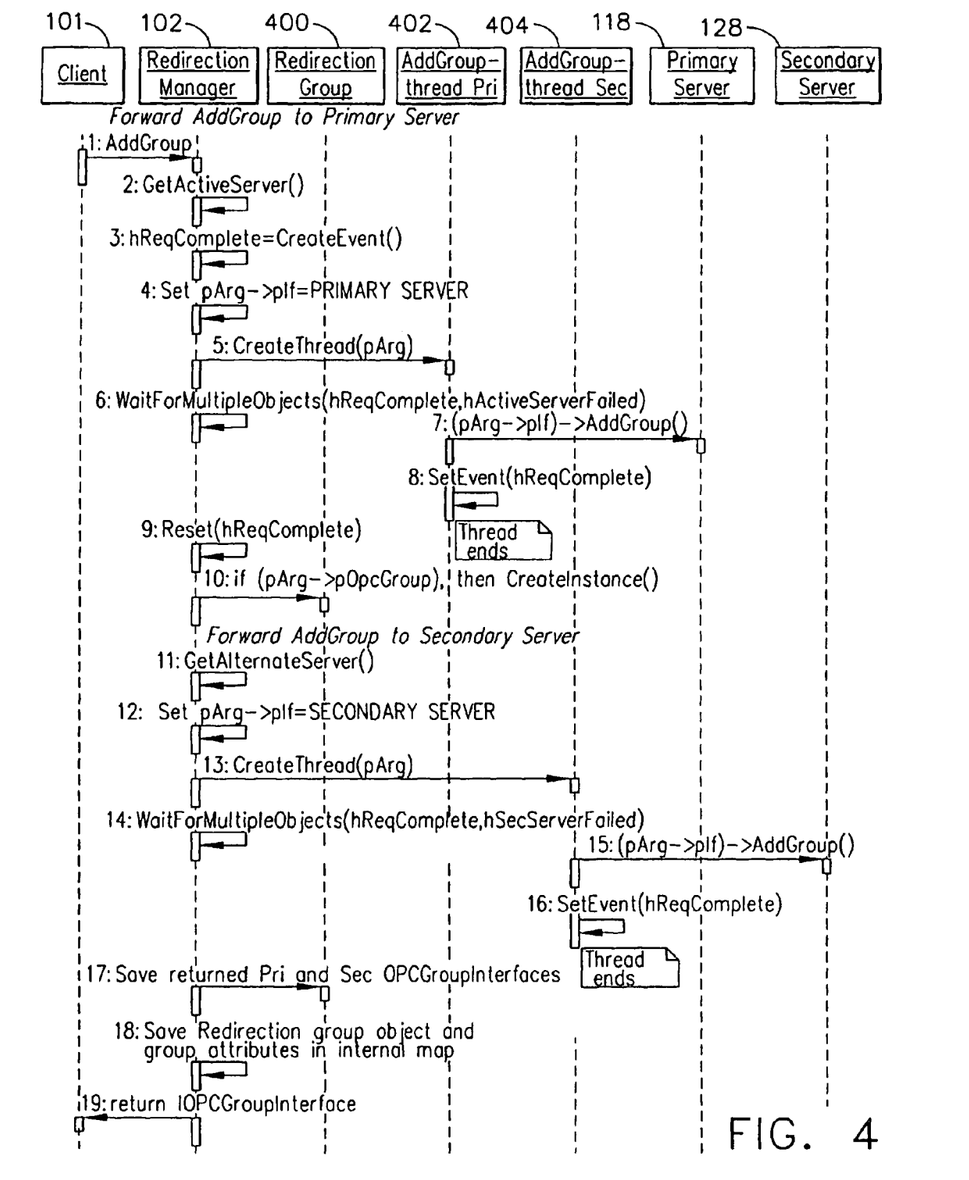
FIG. 4 is a sequence diagram of how a redirection manager maintains state information related to an OPC add-group request, according to the present invention.

FIG. 4 shows how a redirection manager maintains state information related to an OPC add-group request, according to the present invention. The components involved in this scenario are client 101, redirection manager 102, a redirection group 400 (in data access and subscription state data 114), a primary add-group thread 402 (created by redirection manager 102), a secondary add-group thread 404 (created by redirection manager 102), primary server 118, and secondary server 128. The scenario assumes that both primary server 118 and secondary server 128 are available.

FIG. 4 assumes some starting conditions. The administrator has made the necessary configuration using the redirection manager configuration utility to register redirection manager 102. Also, the OPC client 101 made a connection to redirection manager 102.

Table 2 generally describes the specific events shown in FIG. 4. Each event in Table 2 is implemented in example methods shown in FIG. 4.

TABLE 2

| OPC Data Access Scenario: AddGroup | |
|---|---|
| Event | Description of Event |
| 1 | OPC client 101 calls IOPCServer::AddGroup( ). |
| 2 | Redirection manager 102 creates a separate thread, AddGroupThread, and passes the AddGroup parameters as well as primary server 118's IOPCServer interface as arguments to the thread. Redirection manager 102 now waits on two events, request-complete event and active-server-failed event. The primary reason for issuing the client request on a separate thread is to avoid lengthy COM/DCOM timeouts in the event the target server fails. |
| 3 | The AddGroupThread forwards the AddGroup call to one of the target OPC servers, primary server 118. Once the call succeeds the thread sets the request-complete event and exits. |
| 4 | On receiving the request-complete event, redirection manager 102 creates redirection group object 400 that implements all the OPC group interfaces. |

TABLE 2-continued

OPC Data Access Scenario: AddGroup

| Event | Description of Event |
|---|---|
| 5 | Redirection manager 402 repeats steps 2 and 3 for each of the remaining target OPC servers. However, the OPC group is established as inactive on each of these remaining target OPC servers. |
| 6 | Redirection manager 102 saves state information related to the AddGroup call as well as the OPC group interface pointers returned by the target OPC servers in the redirection group object 400. |

Figure 5:
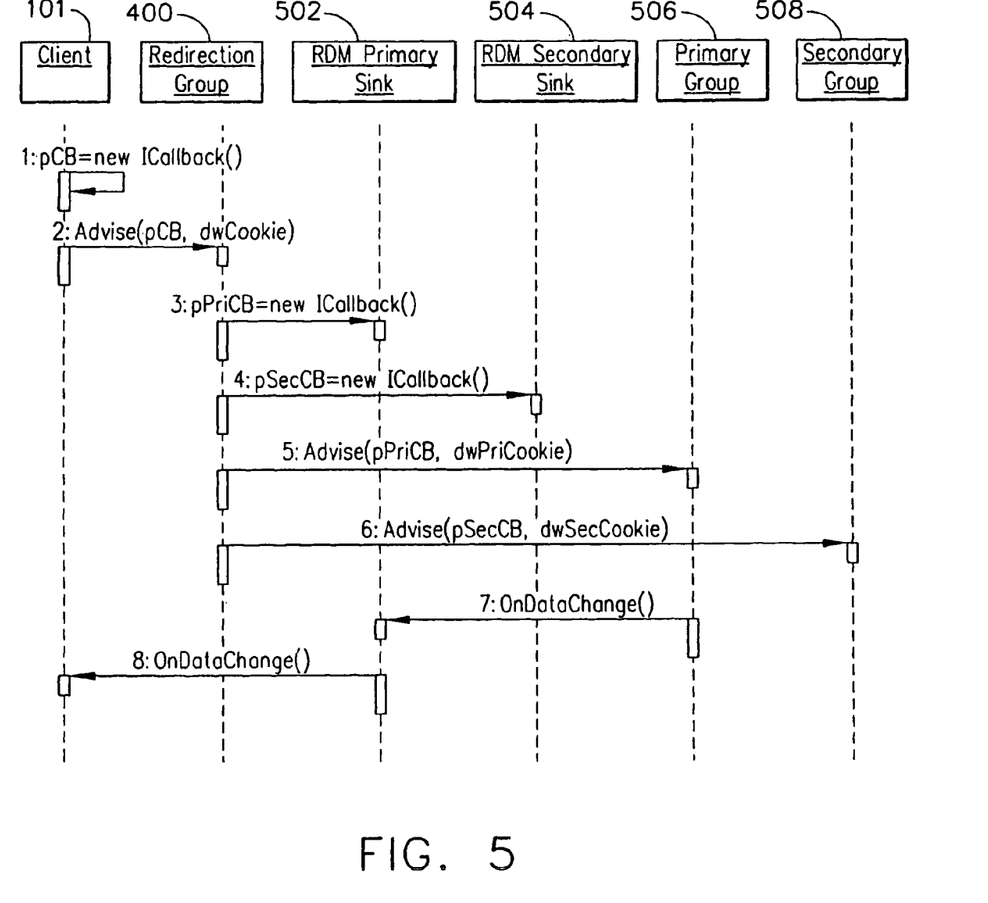
FIG. 5 is a sequence diagram of how a redirection manager handles OPC on-data-change requests, according to the present invention.

FIG. 5 shows how a redirection manager handles OPC on-data-change requests, according to the present invention. The components involved in this scenario are client 101, a redirection group 400 (which is part of data access and subscription state data 114), a redirection manager (RDM) primary sink 502, a redirection manager (RDM) secondary sink 504, a primary group 506 (which is part of primary OPC server 118), and a secondary group 508 (which is part of secondary OPC server 128). This scenario describes how redirection manager 102 handles OPC on-data-change requests and assumes that all the target OPC servers are available.

FIG. 5 assumes some starting conditions. The OPC client 101 has connected to the redirection manager and has added groups and items. The groups and items have been added to all the target OPC servers.

Table 3 generally describes the specific events shown in FIG. 5. Each event in Table 3 is implemented in example methods shown in FIG. 5.

TABLE 3

OPC Data Access Scenario: OnDataChange

| Event | Description of Event |
|---|---|
| 1 | OPC Client 101 creates a sink that implements the callback interface. |
| 2 | OPC Client 101 establishes a connection between the redirection manager group object's connection point and its sink object by calling Advise. |
| 3 | Redirection manager creates separate sink objects for each of the target OPC server connections. |
| 4 | Redirection manager establishes a connection between each of the target OPC server's connection point and its sink objects by calling Advise. |
| 5 | When the active server detects changes in the group data it calls the OnDataChange( ) method on the corresponding sink of the redirection manager. |
| 6 | On receiving the callback, redirection manager forwards the data to the client's OnDataChange( ) method. |

Figure 6:
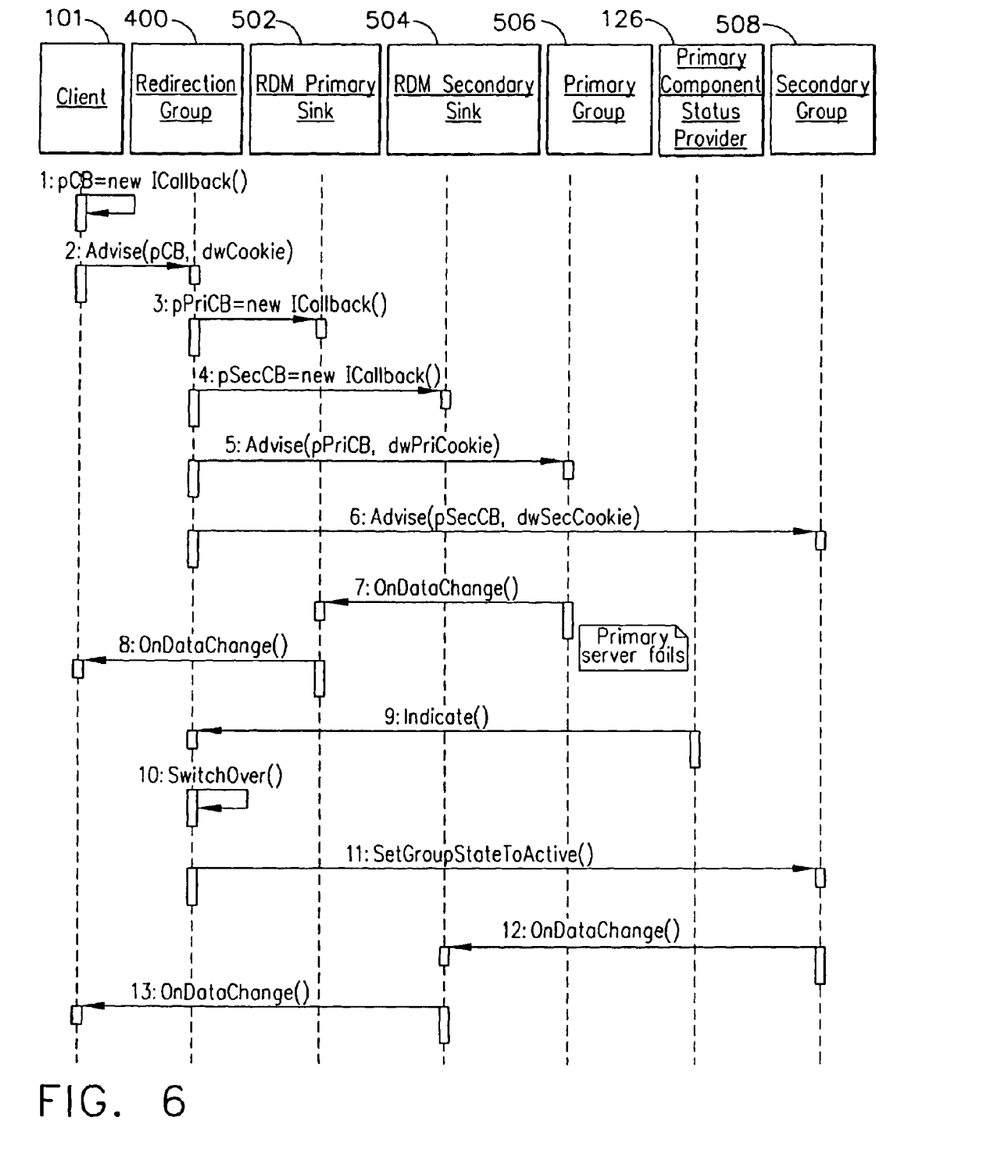
FIG. 6 is a sequence diagram of how a redirection manager handles the failure of the active target OPC server, according to the present invention.

FIG. 6 shows how a redirection manager handles the failure of the active target OPC server, according to the present invention. The components involved in this scenario are OPC client 101, redirection group 400, redirection manager (RDM) primary sink 502, redirection manager (RDM) secondary sink 504, primary group 506, primary component status provider 126, and secondary group 508.

FIG. 6 assumes some starting conditions. OPC client 101 has connected to the redirection manager. OPC client 101 is receiving OnDataChange( ) calls from the redirection manager via the active target OPC server. The active target OPC server fails.

Table 4 generally describes the specific events shown in FIG. 6. Each event in Table 4 is implemented in example methods shown in FIG. 6.

TABLE 4

OPC Data Access Scenario: Active Target OPC Server Fails

| Event | Description of Event |
|---|---|
| 1 | The redirection manager connects to the status change providers and is subscribing for events. |
| 2 | OPC Client 101 sets up callbacks and is receiving OnDatachange( ) calls. |
| 3 | The status change provider on the node of the active target OPC server notifies the redirection manager about the OPC server failure. |
| 4 | The redirection manager switches over to one of the remaining target OPC servers. This becomes the new active target OPC server. The redirection manager sets the appropriate groups on this target OPC server to active. |
| 5 | The redirection manager starts receiving OnDataChange() calls from the new active target OPC server when the group data changes. |

Figure 7:
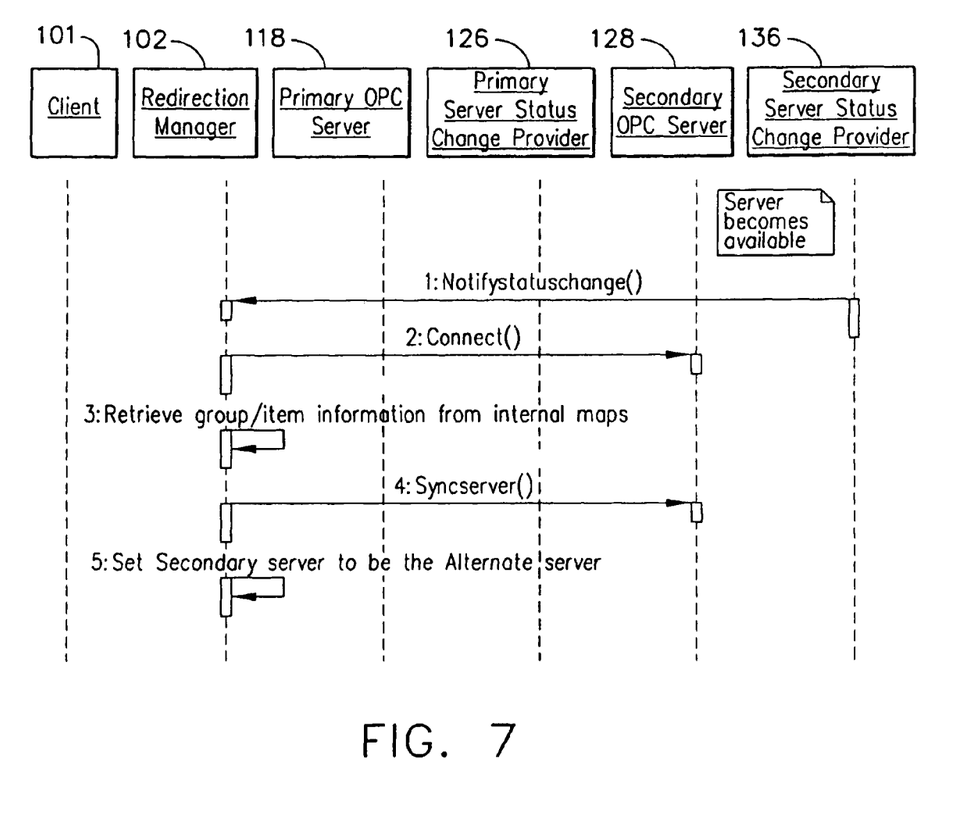
FIG. 7 is a sequence diagram of how a redirection manager synchronizes an alternate target OPC server when it becomes available, according to the present invention.

FIG. 7 shows how a redirection manager synchronizes an alternate target OPC server when it becomes available, according to the present invention. The components involved in this scenario are OPC client 101, redirection manager 102, primary OPC server 118, primary server status change provider 126, secondary OPC server 128, and secondary server status change provider 136.

FIG. 7 assumes some starting conditions. OPC client 101 has connected to redirection manager 102 and is being serviced by the active target OPC server. An alternate target OPC server that was previously not running, starts.

Table 5 generally describes the specific events shown in FIG. 7. Each event in Table 5 is implemented in example methods shown in FIG. 7.

TABLE 5

OPC Data Access Scenario:
Alternate Target OPC Server Becomes Available

| Event | Description of Event |
|---|---|
| 1 | Redirection manager 102 receives notices from an OPC server status change provider that an alternate target OPC server is now running. |
| 2 | Redirection manager 102 connects to this alternate target OPC server and uses its state information to add the OPC groups and OPC items to this alternate target OPC server. |
| 3 | Redirection manager 102 marks this alternate target OPC server as available for a potential switchover. |

Figure 8:
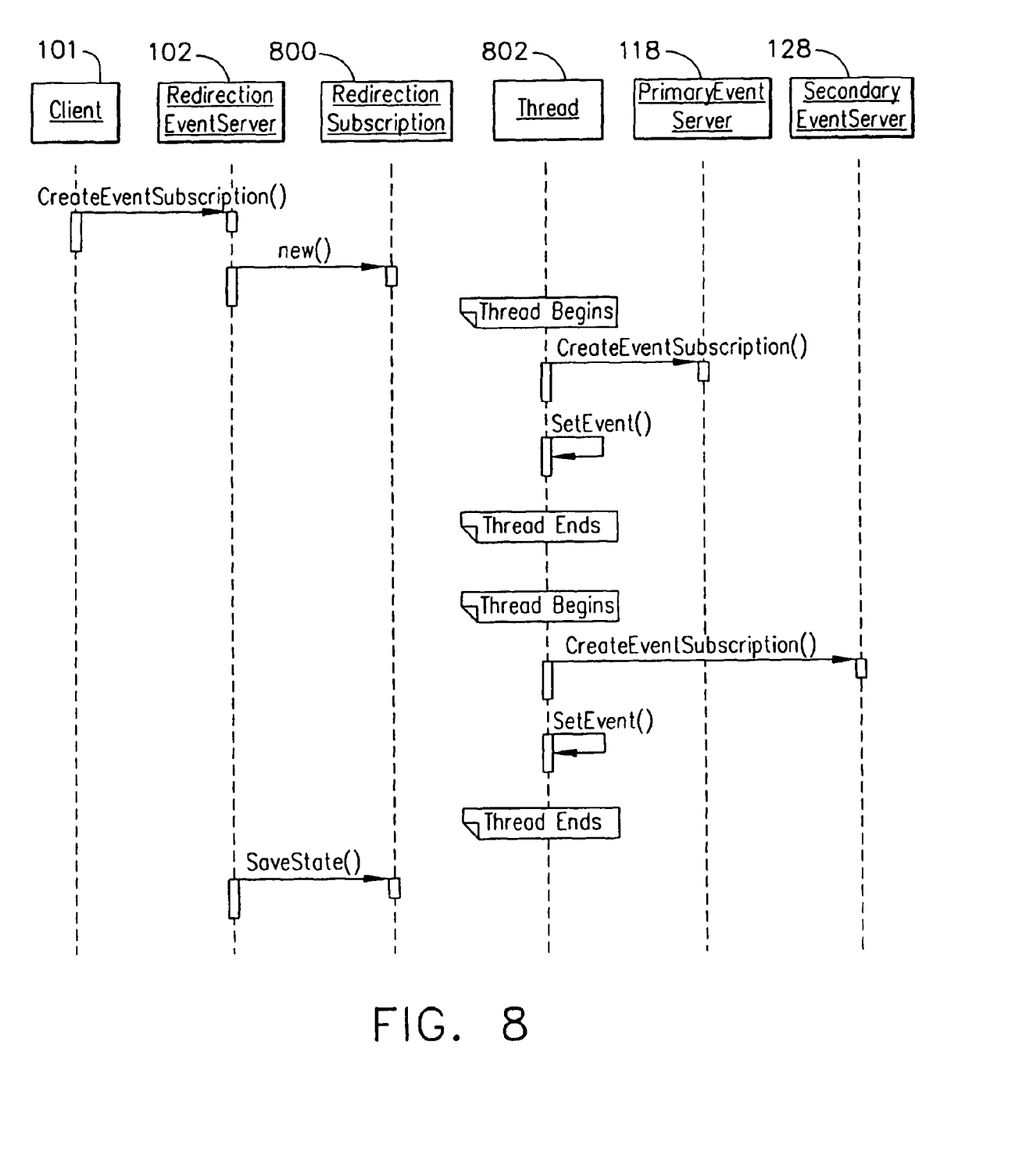
FIG. 8 is a sequence diagram of how a redirection manager maintains state information on behalf of a client for an OPC create-event subscription request, according to the present invention.

FIG. 8 shows how a redirection manager maintains state information on behalf of a client for an OPC create-event subscription request, according to the present invention. The components involved in this scenario are OPC alarms and events client 101, redirection event server (redirection manager) 102, a redirection subscription object 804 (which is part of data access and subscription state data 114), a separate thread 806 (created by redirection manager 102), primary event server 118, and secondary event server 128.

This scenario describes how the redirection manager maintains state information on behalf of an OPC alarm and events client. Specifically, this is shown for the state information related to an OPC CreateEventSubscription call. This scenario assumes that both the Primary and Secondary servers are available. A switchover event is used in lieu of an active-server-failed event, as in the OPC data access scenarios.

Because the redirection manager's OPC alarms and events capabilities are contained within a separate module which is only loaded if alarms and events support is needed by OPC alarms and events client 800, the module itself does not monitor the availability or health of the target servers. Instead, the redirection manager's alarms and events module relies on those facilities contained within the main redirection manager. These main facilities detect a target server failure or service a request to manually switch to an alternate target server, but in either case the alarms and events module simply receives the more generic switchover event.

FIG. 8 assumes some starting conditions. Both primary and secondary servers are available. OPC alarms and events client 800 made a connection to the redirection manager. The redirection manager loaded the alarms and event support module, after detecting that the target OPC servers support OPC alarms and events. OPC alarms and events requests made by the client are being serviced by this module.

Table 6 generally describes the specific events shown in FIG. 8. Each event in Table 6 is implemented in example methods shown in FIG. 8.

TABLE 6

OPC Alarms and Events Scenario:
Create Event Subscription

| Event | Description of Event |
|---|---|
| 1 | OPC alarms and events client 800 calls IOPCEventServer::CreateEventSubscription. |
| 2 | The redirection manager creates redirection subscription object 800 that implements all of the OPC event subscription interfaces. |
| 3 | The redirection manager creates separate thread 802 and passes the CreateEventSubscription parameters as well as primary event server 118's IOPCEventServer interface as arguments to thread 802. |
| 4 | The redirection manager waits for one of two events, a request-complete event or a switchover event. As is true for all redirection manager scenarios utilizing separate thread 802, the primary reason for issuing the request in this manner is to avoid lengthy COM/DCOM timeouts in the event that the target server fails. |
| 5 | Separate thread 802, which is handling the create subscription request, forwards the call to one of the target OPC servers. Once the call succeeds, separate thread 802 sets the request-complete event and exits. |
| 6 | The redirection manager repeats steps 2-4 for each of the remaining target OPC servers. However, the OPC subscription is established as inactive on each of these remaining target OPC servers. |
| 7 | The redirection manager saves state information related to the CreateEventSubscription call as well as the OPC subscription interface pointers returned by the target OPC servers. |

Figure 9:
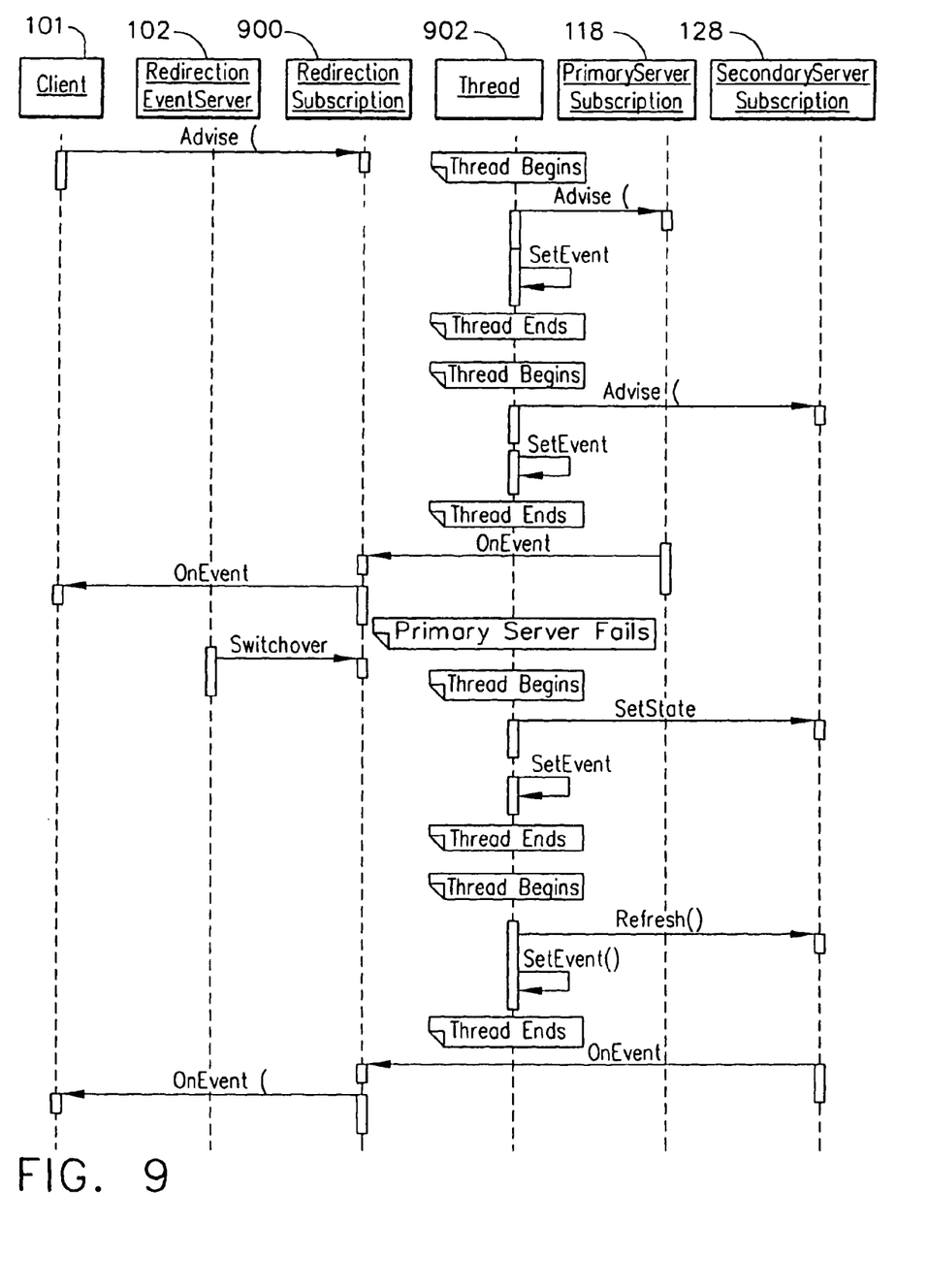
FIG. 9 is a sequence diagram of how a redirection manager handles failure of the active target OPC server when the target servers support OPC alarms and events, according to the present invention.

FIG. 9 shows how a redirection manager handles failure of the active target OPC server when the target servers support OPC alarms and events, according to the present invention. The components involved in this scenario are OPC alarms and events client 101, redirection event server (redirection manager) 102, a redirection subscription 900 (which is part of data access and subscription state data 114), a thread 902 (created by redirection manager 102), a primary server subscription (primary OPC server) 118, and a secondary server subscription (secondary OPC server) 128.

FIG. 9 assumes some starting conditions. The target OPC servers support OPC alarms and events. OPC alarms and events client 101 has connected to the redirection manager. OPC alarms and events client 101 is receiving OnEvent( ) calls from the redirection manager via the active target OPC event server. The active target OPC event server fails.

Table 7 generally describes the specific events shown in FIG. 9. Each event in Table 7 is implemented in example methods shown in FIG. 9.

TABLE 7

OPC Alarms and Events Scenario:
Active Target OPC Server Fails

| Event | Description of Event |
|---|---|
| 1 | Redirection manager 102 connects to status change providers and is subscribing for events. |
| 2 | The OPC alarms and events client 101 has set up subscription callbacks and is receiving OnEvent( ) calls. |
| 3 | The status change provider on the node of the active target OPC event server notifies the redirection manager about the OPC server failure. |
| 4 | Redirection manager 102 switches over to one of the remaining target OPC event servers and declares this to be the new active server. As part of its switchover activities, redirection manager 102 sets the switchover event which alerts functionality within the alarms and events module that a switchover is in progress. |
| 5 | Event subscriptions within the target OPC event server are set to active from inactive. |
| 6 | Redirection manger 102 issues a refresh request to each newly active subscription on behalf of OPC alarms and events client 101. This gives OPC alarms and events client 900 the opportunity to synchronize its view of currently active events or inactive but unacknowledged events with that of the target server. This also ensures that any events which may have occurred during the switchover are still presented to the client and not lost. |
| 7 | Redirection manager 102 starts receiving OnEvent( ) calls from the new active target OPC event server as new events occur. |

Figure 10:
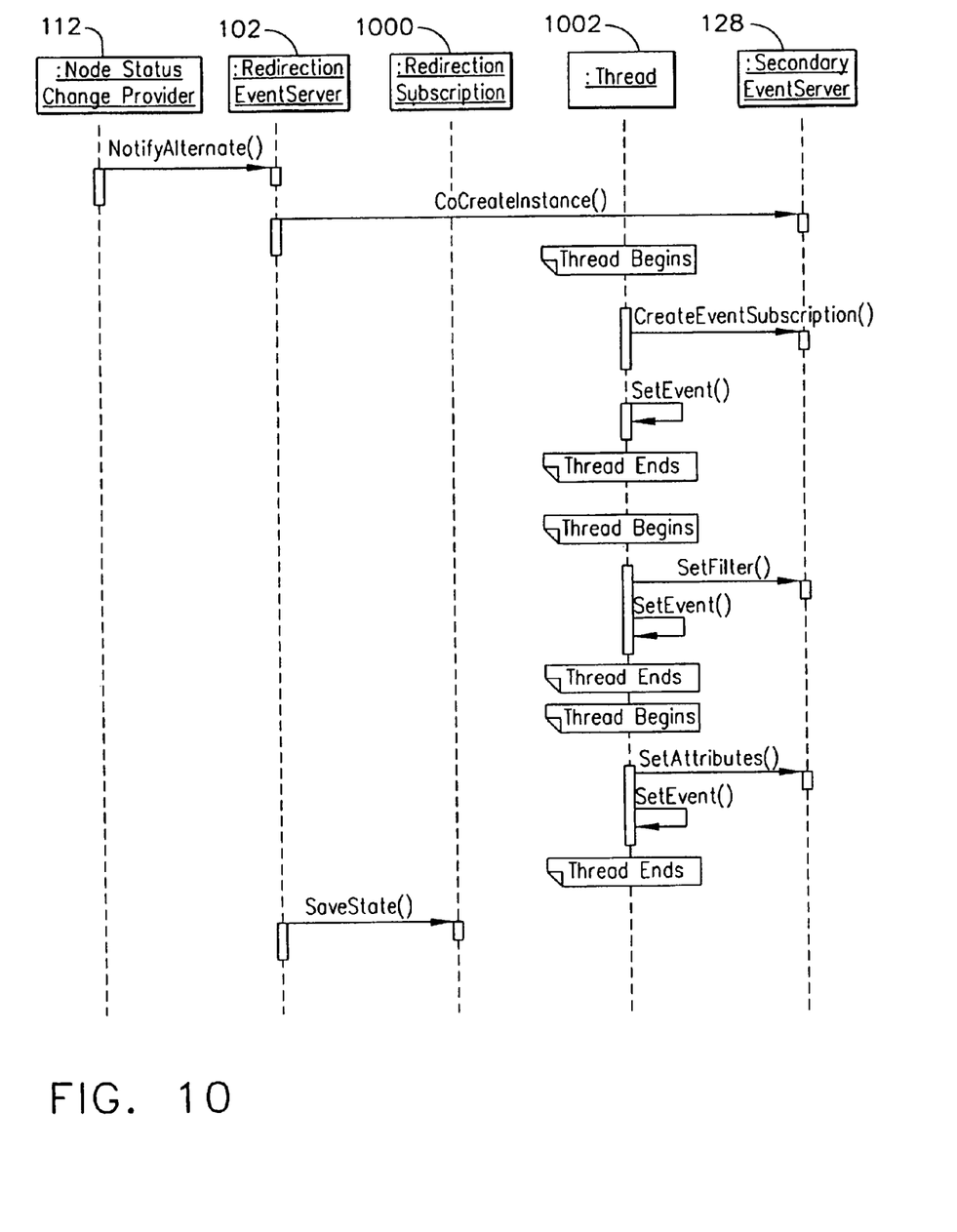
FIG. 10 is a sequence diagram of how a redirection manager synchronizes an alternate target OPC server when it becomes available, according to the present invention.

FIG. 10 shows how a redirection manager synchronizes an alternate target OPC server when it becomes available, according to the present invention. The components involved in this scenario are node status change provider 112, redirection event server (redirection manager) 102, a redirection subscription 1000 (which is part of data access and subscription state data 114), a thread 1002 (created by redirection manager 102), and secondary event server (secondary OPC server) 128.

FIG. 10 assumes some starting conditions. The target OPC servers support OPC alarms and events. The OPC client has connected to the redirection manager and is being serviced by the active target OPC event server. An alternate target OPC event server that was previously not running, starts.

Table 8 generally describes the specific events shown in FIG. 10. Each event in Table 8 is implemented in example methods shown in FIG. 10.

TABLE 8

OPC Alarms and Events Scenario:
Alternate Target OPC Server Becomes Available

| Event | Description of Event |
|---|---|
| 1 | The redirection manager receives notice from a status change provider that an alternate target OPC event server is now running. |
| 2 | The redirection manager connects to this alternate target OPC event server and notifies the alarms and events module that the new target is available. |
| 3 | The alarms and events module uses saved state information to add the OPC event subscriptions and apply subscription-specific filters and other settings to this alternate OPC event server. |
| 4 | The redirection manager marks this alternate target OPC server as available for a potential switchover. |

It is to be understood that the above description is intended to be illustrative and not restrictive. Many other embodiments will be apparent to those of skill in the art upon reviewing the above description, such as adaptations of the present invention to revisions to the OPC specification or including the present invention in a larger system so that some components named clients are servers or vice-versa. The present invention has applicability to fields outside process control and industrial automation. Therefore, the scope of the present invention should be determined with reference to the appended claims, along with the full scope of equivalents to which such claims are entitled.

What is claimed is:

1. A method of redirection management, comprising:

in response to an OPO create-event-subscription request from an OPC client, implementing interfaces associated with said OPO create-event-subscription request;

creating a separate thread to handle said OPO create event-subscription request;

using said separate thread to forward said OPC create-event-subscription request to a primary target OPO server for service;

using said separate thread to forward said OPC create-event-subscription request to at least one additional target OPC server as inactive, said at least one additional target OPO server including a secondary target OPC server configured to backup said primary target OPO server;

storing information related to said OPC create-event-subscription request, including state information;

connecting to said primary target OPC server;

connecting to an OPC server status change provider for said primary target OPC server;

connecting to said at least one additional target OPC server; determining that said primary target OPO server supports OPO alarms and events;

loading an alarms-and-events module providing at least one on-event request to said OPC client from said primary target OPC server;

upon receiving an active-server-failed event from said OPC server status change provider for said primary target OPC server, performing a switchover to said secondary target OPC server; and notifying said alarms-and-events module of said switchover.

2. The method according to claim 1, further comprising:

retrieving all events from said secondary OPC target server and forwarding said events to said OPC client to prevent loss of events; and providing an OPC on-event request to said OPC client from said secondary target OPC server.

3. The method according to claim 1, further comprising:

receiving notice from said OPC server status change provider that said primary target OPC server is now available;

connecting to said primary target OPC server; and establishing said primary target OPC server with said state information.

* * * * *

UNITED STATES PATENT AND TRADEMARK OFFICE
CERTIFICATE OF CORRECTION

PATENT NO. : 7,451,215 B2 Page 1 of 1
APPLICATION NO. : 11/786508
DATED : November 11, 2008
INVENTOR(S) : Ellen B. Hawkinson et al.

It is certified that error appears in the above-identified patent and that said Letters Patent is hereby corrected as shown below:

In Column 15, line 13, delete "OPO" add -- OPC --;
In Column 15, line 15, delete "OPO" add -- OPC --;
In Column 15, line 16, delete "OPO" add -- OPC --;
In Column 15, line 19, delete "OPO" add -- OPC --;
In Column 15, line 24, delete "OPO" add -- OPC --;
In Column 15, line 25, delete "OPO" add -- OPC --;
In Column 16, line 4, delete "OPO" add -- OPC --;
In Column 16, line 5, delete "OPO" add -- OPC --.

Signed and Sealed this

Sixth Day of January, 2009

JON W. DUDAS
*Director of the United States Patent and Trademark Office*